United States Patent [19]

Hamano

[11] Patent Number: 4,503,719
[45] Date of Patent: Mar. 12, 1985

[54] BUFFERING MECHANISM FOR AUTOMOTIVE STARTER

[75] Inventor: Isao Hamano, Himeji, Japan

[73] Assignee: Mitsubishi Denki Kabushiki Kaisha, Japan

[21] Appl. No.: 432,808

[22] Filed: Oct. 5, 1982

[30] Foreign Application Priority Data

Oct. 9, 1981 [JP] Japan .................. 56-150243

[51] Int. Cl.$^3$ .............. F02N 15/04; F16H 57/08; F16H 1/32
[52] U.S. Cl. ........................ 74/7 E; 74/411; 74/785; 74/801
[58] Field of Search ............ 74/7 E, 785, 411, 801

[56] References Cited

U.S. PATENT DOCUMENTS

| | | | |
|---|---|---|---|
| 1,864,256 | 6/1932 | Nardone | 74/801 |
| 2,500,393 | 3/1950 | Williams | 74/801 |
| 2,868,037 | 1/1959 | Hindmarch | 74/785 |
| 3,209,603 | 1/1965 | Rodriguez | 74/7 A |
| 3,583,825 | 6/1971 | Sadler | 74/801 X |
| 3,788,151 | 1/1974 | Campau | 74/7 A |
| 4,156,817 | 5/1979 | Preece et al. | 290/38 R |
| 4,163,165 | 7/1979 | Purdy | 310/154 |

*Primary Examiner*—Allan D. Herrmann
*Attorney, Agent, or Firm*—Leydig, Voit, Osann, Mayer and Holt, Ltd.

[57] ABSTRACT

A buffering mechanism for an automotive starter using planetary gear speed reduction mechanism between a motor and a pinion torque transmission mechanism is disclosed, in which elastic members are provided in spaces defined between circumferentially opposed sides of depressions formed in the outer periphery of a ring gear of the planetary gear speed reduction mechanism and depressions formed in the inner periphery of a member receiving a reaction force.

1 Claim, 4 Drawing Figures

BUFFERING MECHANISM FOR AUTOMOTIVE STARTER

BACKGROUND OF THE INVENTION

This invention relates to starters of internal speed reduction type and, more particularly, to improvements in a buffering mechanism of a starter in which incorporating a planetary speed reduction mechanism.

A prior art speed reduction mechanism of the type mentioned is shown in FIGS. 1 and 2. The mechanism comprises a DC motor 1, which includes an armature 2, a pole member 3 constituted by a permanent magnet material for magnetically energizing the armature, a yoke 4 carrying the pole 3 mounted on the inner periphery. A rotary shaft 5 of the armature 2 is supported in a bearing 7, which is mounted on the inner periphery of an intermediate bracket 6 which is in turn fitted in socket 4a of the yoke 4. The rotary shaft 5 has an extension, on which a spur gear 8 is formed. An output shaft 9 is supported via a sleeve bearing 10 on the extension of the rotary shaft 5. Planetary gears 11 are coupled between the spur gear 8 and an internal ring gear 12 which is fittedly secured to the socket 4a of the yoke 4. Each planetary gear 11 is supported on a bearing 14, which is in turn fitted on a pin 13 extending from a flange 9a formed at the end of the output shaft 9. These planetary gears 11 execute planetary motion. The ring gear 12 is formed on the outer periphery with grooves 12b, and projections projecting from the inner periphery of the yoke 4 are received in the grooves 12a, thus receiving the reaction force against the motion of the planetary gears.

In operation, the armature 2 is energized from a battery (not shown) to produce a torque in a magnetic field produced by the pole member 3. This torque is transmitted through the spur gear 8 on the shaft 5 to the planetary gears 11. Thus, a motion of the planetary gears 11 is produced, causing rotation of the pins 13 in the direction of rotation of the spur gear 8. This torque is transmitted to the output shaft 9 via the flange 9a. With the motion of the planetary gears, a reaction force against the torque is produced in the ring gear 12. The reaction force is transmitted through the projections 4a, which are in engagement with the grooves 12a in the peripheral direction, to the yoke 4 and received by the same. The torque of the output shaft 9 is transmitted through a pinion (not shown), which is mounted on the force end of the shaft 9, to a ring gear (not shown) in an internal combustion engine.

The prior art starter described above is not provided with any mechanism for buffering an impact load exerted to the power transmission mechanism section. Therefore, it is difficult to obtain sufficient reliability with respect to a comparatively high load. In addition, the speed reduction mechanism as described above has a short life.

SUMMARY OF THE INVENTION

The invention is intended to the drawbacks as described above in the prior art speed reduction mechanism, and its object is to provide a starter motor provided with a planetary gear speed reduction mechanism, which the outer periphery of the ring gear of the planetary gear speed reduction mechanism is supported with an elastic member so that an impact load can be buffered.

DESCRIPTION OF THE DRAWINGS

In the Figures, like reference numerals designate like parts.

DESCRIPTION OF THE PREFERRED EMBODIMENTS

Figure 2:
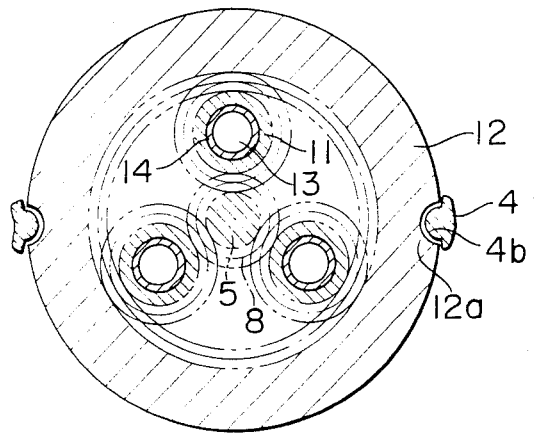
FIG. 2 is a sectional view taken along line II—II in FIG. 1.
Figure 3:
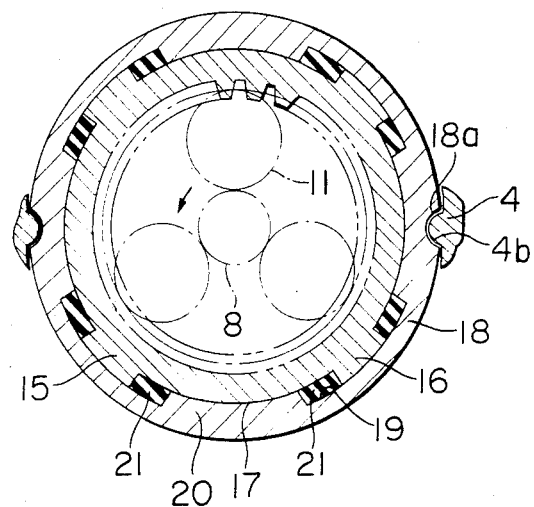
FIG. 3 is a sectional view similar to FIG. 2 but showing an embodiment of the invention.

Now, an embodiment of the invention will be described with reference to the drawings. Referring to FIG. 3, reference numeral 15 designates an internal ring gear, which has its outer periphery formed with a plurality of circumferentially spaced-apart raised portions 16 having a sector-like sectional profile and depressions 17 defined by adjacent sector-like raised portions. Reference numeral 18 designates a housing, which has its inner periphery formed with depressions having a sector-like sectional profile and raised portions 20 defined between adjacent sector-like depressions. The sector-like raised portions 16 of the ring gear 15 are received in the corresponding sector-like depressions 19 of the housing 18, and the raised portions 20 of the housing 18 are received in the depressions 17 of the ring gear 15. The raised portions 16 are loosely received in the depressions and the raised portions 20 are loosely received in the depressions 17 in the circumferential direction so that the ring gear 15 can be rotated a small angle with respect to the housing 18. The spaces defined between opposed side surfaces of the raised portions 16 and 20 are filled with elastic members 21 made of an elastic material, e.g., rubber. The housing 18 has its outer periphery formed with grooves 18a, which have the same function as described earlier in connection with the prior art construction shown in FIG. 2, and in which projections 4b of a yoke 4 are received.

With the above construction, the reaction force produced by the ring gear 15 against the force of mesh with the planetary gears 11 is transmitted via the elastic members 21 to the housing 18 and thence to the yoke 4. Thus, the impact load can be very readily buffered.

Figure 4:
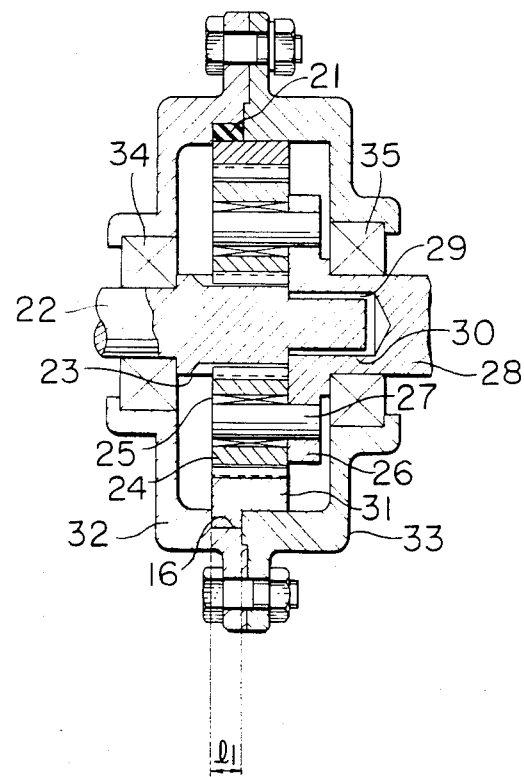
FIG. 4 is a sectional view showing a different embodiment of the invention.

The housing may be constituted by the machine frame itself. FIG. 4 shows a construction in such a case. Reference numeral 22 designates an input shaft carrying a spur gear 23, which is in mesh with planetary gears 24. Each planetary gear 24 is supported on a gearing 25, which is in turn supported on a pin 27 projecting from a flange 26 of an output shaft 28. The end of the output shaft 28 is formed with a bore 30. A sleeve bearing 29 which supports the output shaft 28 is fitted in the bore 30 thereof, thus supporting the afore-mentioned end of the output shaft 28. Meshing with the planetary gears 24 is an internal ring gear 31. The ring gear 31 has a rear half of its outer periphery (indicated at $l_1$) formed with sector-like raised portions 16 having the same function as described before in connection with FIG. 3. The raised portions 16 are received in sector-like depressions formed in a rear half 32 of a machine frame (having the same shape as the depressions shown in FIG. 3). The circumferential reaction force (which is received by the ring gear 31) is transmitted via elastic members 21 to the frame rear half 32. A front half 33 of the machine frame, which is secured to the rear half 32 of frame smoothly fits on the front half (indicated at l₂) of the outer periphery of the ring gear 31, thus supporting the ring gear 31 with accurate coaxialness. Ball bearings 34 and 35 are mounted in the respective rear and front halves 32 and 33 of the machine frame and support the shafts 22 and 28 respectively.

Figure 1:
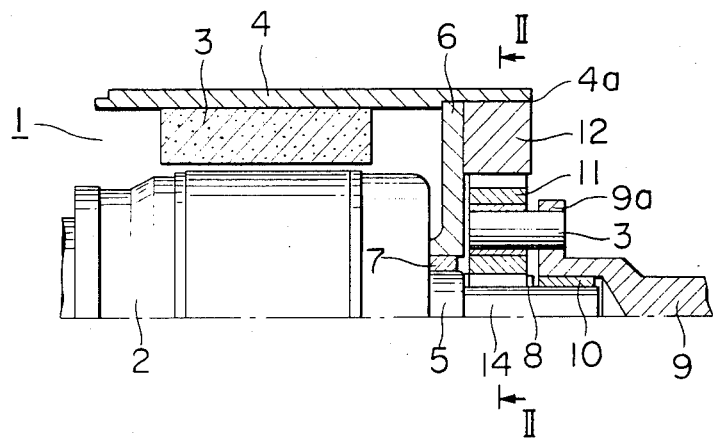
FIG. 1 is a side view, partly in section, showing an essential part of a prior art starter motor.

With the above construction, in addition to obtaining the reduction of the number of component parts, sufficient positional accuracy (coaxialness) of the gear portion of the ring gear 31 can be maintained even at the time of the rotation of the ring gear 31 for a small angle. Thus, a speed reduction mechanism of a very high precision can be obtained. Further, the rear half 32 of the machine frame can be constructed by additionally processing the yoke 4 and flange 6 in the prior art system shown in FIG. 1 to obtain the same effects.

Further, the elastic members 21 may be replaced with metal members of spring steel or the like to obtain the same effects.

As has been described in the foregoing, according to the invention the reaction force received by the ring gear of the planetary gear speed reduction mechanism is transmitted to the housing via elastic members provided in spaces defined between circumferentially opposed sides of depressions formed in the outer periphery of the ring gear and in the inner periphery of the housing. Thus, the impact load can be buffered with a very simple construction, so that it is possible to improve the reliability of the planetary gear section even in case when the mechanism is applied to an automotive starter or the like which is subject to great load variations.

What is claimed is:

1. In an automotive starter including a planetary gear speed reduction mechanism between a motor and a pinion torque transmission system, the improvement comprising a machine frame for said system having front and rear halves, a ring gear engaging the inner periphery of said front and rear halves of said frame, a buffering mechanism for said automotive starter including elastic members provided in spaces defined between circumferentially opposed sides of depressions formed in axially divided one half of the outer periphery of said ring gear and depressions formed in the inner periphery of the corresponding half of the machine frame, the other axial half of the ring gear outer periphery being smoothly fitted in the other machine frame half.

* * * * *